United States Patent [19]

Miller, Sr.

[11] Patent Number: 6,012,704
[45] Date of Patent: Jan. 11, 2000

[54] TABLE AND CHAIR TRANSPORTER

[76] Inventor: Bruce Miller, Sr., 4645 Thad Miller Rd., Lenoir, N.C. 28645

[21] Appl. No.: 09/036,425

[22] Filed: Mar. 5, 1998

[51] Int. Cl.$^7$ ....................................................... B66F 3/00
[52] U.S. Cl. ........................................... 254/8 R; 414/498
[58] Field of Search .................................... 414/495, 498, 414/458, 608; 187/233, 250; 254/8 R, 8 B, 8 C, 9 R, 9 B, 9 C

[56] References Cited

U.S. PATENT DOCUMENTS

| | | | |
|---|---|---|---|
| 410,157 | 9/1889 | De Weese | 254/9 C |
| 841,683 | 1/1907 | Gledhill | 254/9 R |
| 2,803,363 | 8/1957 | Hutchinson | 414/608 |
| 2,913,133 | 11/1959 | Yagi | 414/495 |
| 3,424,489 | 1/1969 | Hoy | 414/495 X |
| 4,457,492 | 7/1984 | Lahti | 254/8 B |
| 4,482,130 | 11/1984 | Paredes | 254/8 R |
| 5,056,981 | 10/1991 | Knowles | 414/495 |
| 5,228,824 | 7/1993 | Satoyoshi | 414/498 X |
| 5,405,236 | 4/1995 | Sundstrom et al. | 414/495 |
| 5,595,469 | 1/1997 | Evans | 414/458 |
| 5,660,578 | 8/1997 | Meier | 254/8 R X |
| 5,778,251 | 8/1998 | Johnson | 414/495 X |
| 5,879,122 | 3/1999 | Voelzke | 414/495 X |

FOREIGN PATENT DOCUMENTS

| | | | |
|---|---|---|---|
| 20373 | 5/1929 | Australia | 254/9 R |
| 3536566 | 5/1990 | Germany | 254/9 R |

*Primary Examiner*—David A. Bucci

[57] ABSTRACT

A transport cart is provided including a frame having a pair of spaced lower side bars. A plurality of wheels are mounted on the lower side bars of the frame. An elevation assembly is slidably mounted to the frame about a vertical axis and includes a pair of spaced support side bars. Finally, a mechanism is provided for selectively raising the elevation assembly.

10 Claims, 4 Drawing Sheets

TABLE AND CHAIR TRANSPORTER

BACKGROUND OF THE INVENTION

1. Field of the Invention

The present invention relates to carts and more particularly pertains to a new table and chair transporter for transporting a plurality of chairs and tables.

2. Description of the Prior Art

The use of carts is known in the prior art. More specifically, carts heretofore devised and utilized are known to consist basically of familiar, expected and obvious structural configurations, notwithstanding the myriad of designs encompassed by the crowded prior art which have been developed for the fulfillment of countless objectives and requirements.

Known prior art carts include U.S. Pat. No. 5,037,117; U.S. Pat. No. 5,253,887; U.S. Pat. Des. 332.336; U.S. Pat. No. 5,308,094; U.S. Pat. No. 4,917,393; and U.S. Pat. No. 5,123,666.

In these respects, the table and chair transporter according to the present invention substantially departs from the conventional concepts and designs of the prior art, and in so doing provides an apparatus primarily developed for the purpose of transporting a plurality of chairs and tables.

SUMMARY OF THE INVENTION

In view of the foregoing disadvantages inherent in the known types of carts now present in the prior art, the present invention provides a new table and chair transporter construction wherein the same can be utilized for transporting a plurality of chairs and tables.

The general purpose of the present invention, which will be described subsequently in greater detail, is to provide a new table and chair transporter apparatus and method which has many of the advantages of the carts mentioned heretofore and many novel features that result in a new table and chair transporter which is not anticipated, rendered obvious, suggested, or even implied by any of the prior art carts, either alone or in any combination thereof.

To attain this, the present invention generally comprises a frame having a pair of horizontally oriented lower side bars and a pair of vertically oriented rear bars mounted to rear ends of the lower side bars and extending upwardly therefrom. A horizontally oriented handle bar is fixedly coupled between top ends of the rear bars. The frame further includes a pair of vertically oriented front bars coupled to the lower side bars adjacent to and spaced from front ends of the lower side bars. The front bars extend upwardly from the lower side bars with sleeves mounted thereon. A pair of horizontally oriented upper side bars are mounted between top ends of the front bars and the rear bars at a location spaced from and adjacent to the top ends thereof. Next provided is a wheel assembly including wheels mounted to the front ends of the lower side bars of the frame. Such wheels are adapted to pivot about a fixed horizontal axis. A pair of caster wheels are mounted to rear ends of the lower side bars of the frame and serve to pivot about a horizontal axis which is pivotable about a vertical axis. As shown in the Figures, a table elevation assembly includes a pair of vertically oriented front bars slidably situated within the sleeves of the frame. Coupled to top ends of the front bars of the table elevation assembly is a pair of horizontally oriented support side bars. The support side bars have a length equal to the lower side bars of the frame. A pair of L-shaped side bars each have a horizontal extent coupled to the corresponding front bar of the table elevation assembly. A vertical extent of each L-shaped side bar is coupled to the corresponding support side bar. The L-shaped side bars are coupled in parallel relationship via a pair of cross bars mounted between top and bottom ends of the vertical extents of the L-shaped side bars. An elevation mechanism has a crank mounted on the frame adjacent to the handle thereof and rotatable about a horizontal axis. The crank is adapted for selectively elevating the table elevation assembly with at least one table being supported on the support side bars thereof. Finally, a chair support includes a pair of L-shaped side bars each having a horizontal extent with an upwardly extending tab mounted to a front end thereof. Each L-shaped side bar includes a vertical extent with a top end having a tab mounted thereon and a bottom end with a groove formed thereon. Note FIG. 1. The L-shaped side bars of the chair support are coupled in parallel relationship via a cross bar mounted between bottom ends of the vertical extents of the L-shaped side bars of the chair support. It should be noted that the cross bar of the chair support has a length which is half that of the L-shaped side bars of the table elevation assembly. In use, the chair support is removably mounted between the cross bars of the table elevation assembly for supporting at least one chair thereon.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new table and chair transporter apparatus and method which has many of the advantages of the carts mentioned heretofore and many novel features that result in a new table and chair transporter which is not anticipated, rendered obvious, suggested, or even implied by any of the prior art carts, either alone or in any combination thereof.

It is another object of the present invention to provide a new table and chair transporter which may be easily and efficiently manufactured and marketed.

It is a further object of the present invention to provide a new table and chair transporter which is of a durable and reliable construction.

An even further object of the present invention is to provide a new table and chair transporter which is susceptible of a low cost of manufacture with regard to both materials and labor, and which accordingly is then susceptible of low prices of sale to the consuming public, thereby making such table and chair transporter economically available to the buying public.

Still yet another object of the present invention is to provide a new table and chair transporter which provides in the apparatuses and methods of the prior art some of the advantages thereof, while simultaneously overcoming some of the disadvantages normally associated therewith.

Still another object of the present invention is to provide a new table and chair transporter for transporting a plurality of chairs and tables.

Even still another object of the present invention is to provide a new table and chair transporter that includes a frame having a pair of spaced lower side bars. A plurality of wheels are mounted on the lower side bars of the frame. An elevation assembly is slidably mounted to the frame about a vertical axis and includes a pair of spaced support side bars. Finally, a mechanism is provided for selectively raising the elevation assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
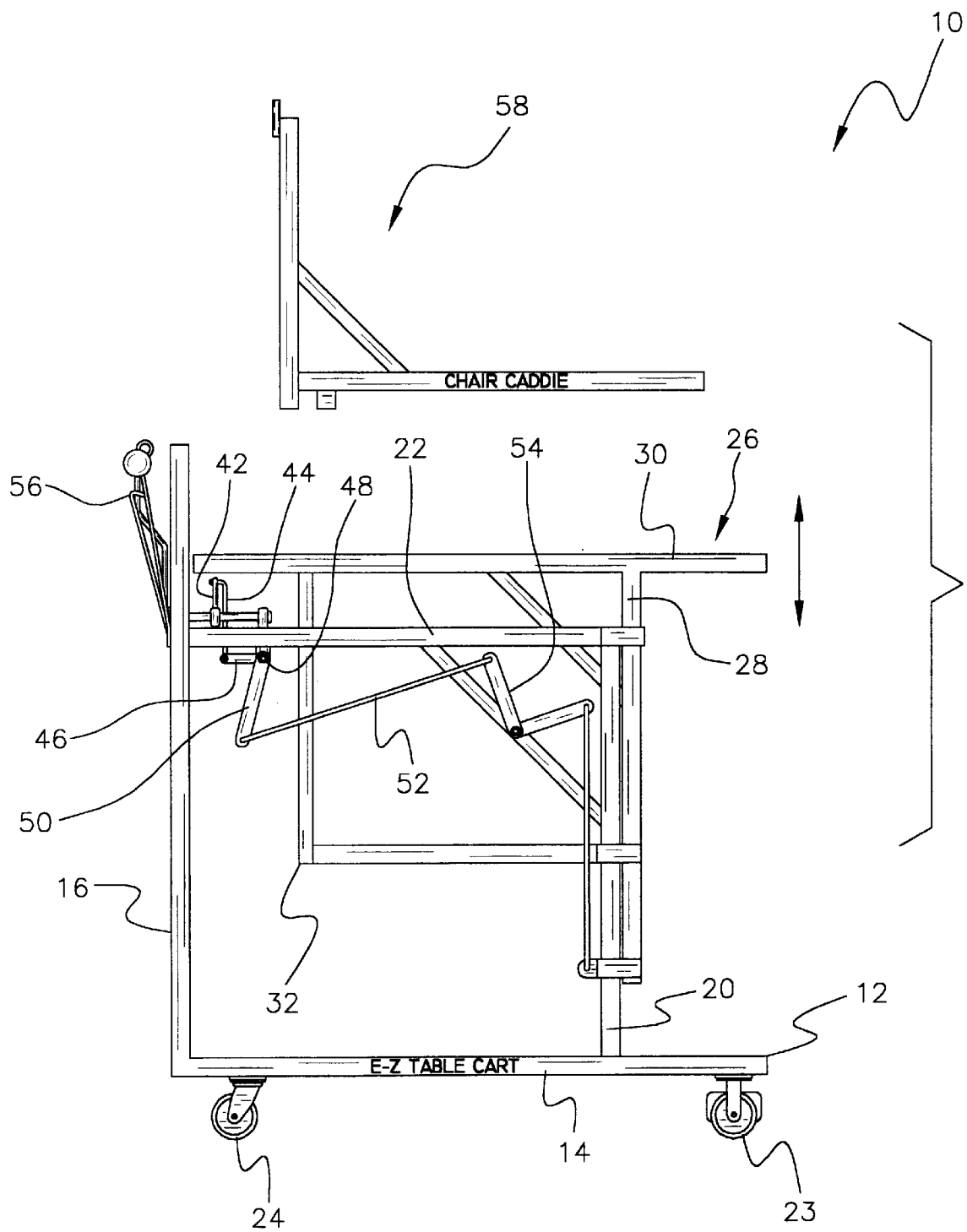
FIG. 1 is an exploded side view of a new table and chair transporter according to the present invention.

With reference now to the drawings, and in particular to FIGS. 1 through 5 thereof, a new table and chair transporter embodying the principles and concepts of the present invention and generally designated by the reference numeral 10 will be described.

The present invention, designated as numeral 10, includes a frame 12 having a pair of horizontally oriented lower side bars 14 and a pair of vertically oriented rear bars 16 mounted to rear ends of the lower side bars and extending upwardly therefrom. A horizontally oriented handle bar 18 is fixedly coupled between top ends of the rear bars 16. The frame further includes a pair of vertically oriented front bars 20 coupled to the lower side bars 14 adjacent to and spaced from front ends of the lower side bars. The front bars 20 extend upwardly from the lower side bars with sleeves mounted thereon. A pair of horizontally oriented upper side bars 22 are mounted between top ends of the front bars 20 and the rear bars 16 at a location spaced from and adjacent to the top ends thereof.

Next provided is a wheel assembly including wheels 23 mounted to the front ends of the lower side bars of the frame. Such wheels are adapted to pivot about a fixed horizontal axis. For reasons that will become apparent hereinafter, a protective plate is mounted to an interior surface of the wheels, as shown in FIG. 1. A pair of caster wheels 24 are mounted to rear ends of the lower side bars of the frame and serve to pivot about a horizontal axis which is pivotable about a vertical axis.

As shown in the Figures, a table elevation assembly 26 includes a pair of vertically oriented front bars 28 slidably situated within the sleeves of the frame. It should be noted that the front bars 28 of the table elevation assembly are also equipped with sleeves which slidably receive the front bars 20 of the frame. Coupled to top ends of the front bars 28 of the table elevation assembly is a pair of horizontally oriented support side bars 30. The support side bars 30 have a length equal to the lower side bars of the frame. A pair of L-shaped side bars 32 each have a horizontal extent coupled to the corresponding front bar of the table elevation assembly. A vertical extent of each L-shaped side bar is coupled to the corresponding support side bar 30. The L-shaped side bars are coupled in parallel relationship via a pair of cross bars mounted between top and bottom ends of the vertical extents of the L-shaped side bars.

Figure 2:
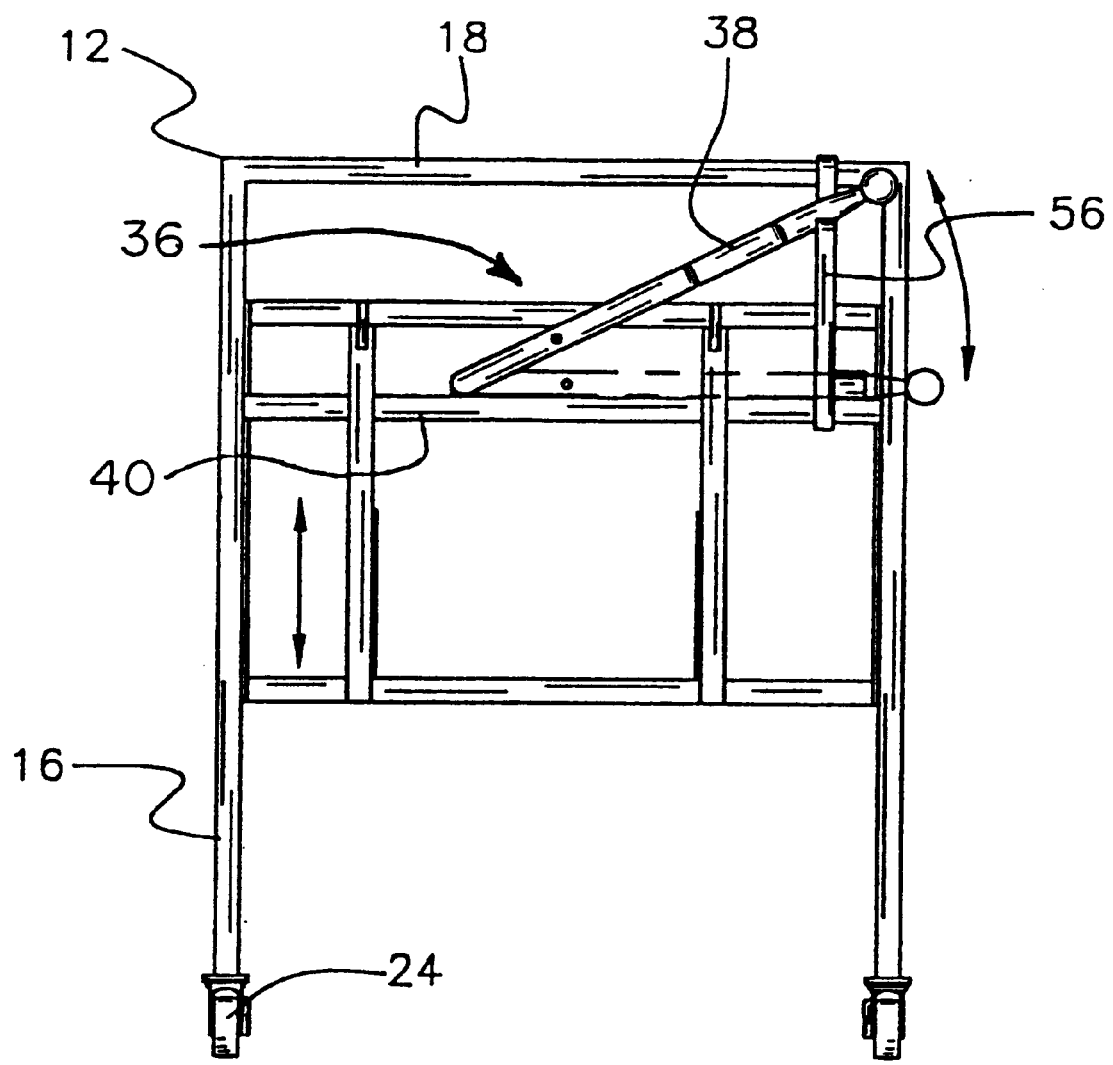
FIG. 2 is a rear view of the present invention.
Figure 3:
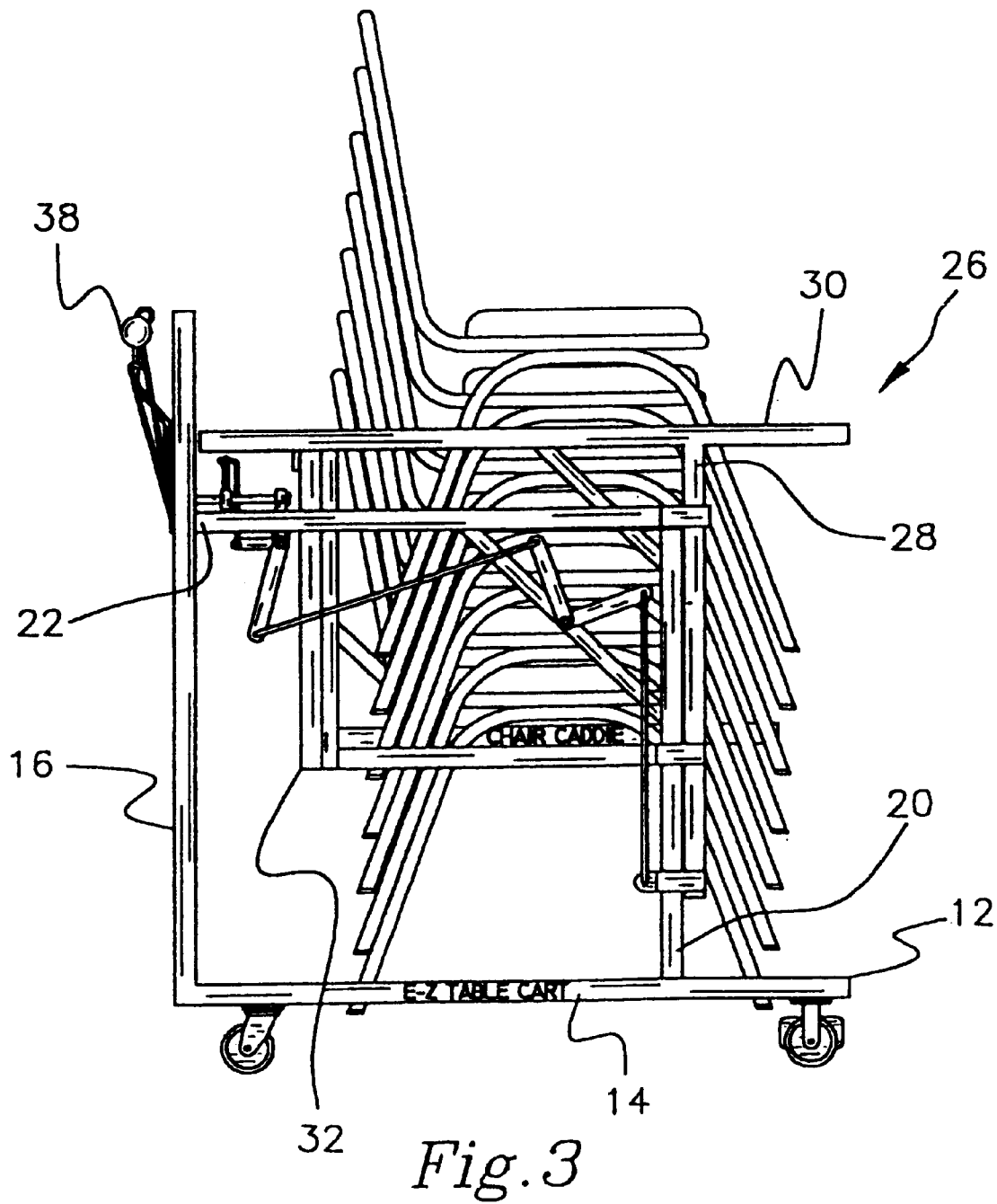
FIG. 3 is a side view of the present invention with the chair support attached thereto for supporting a plurality of chairs.
Figure 4:
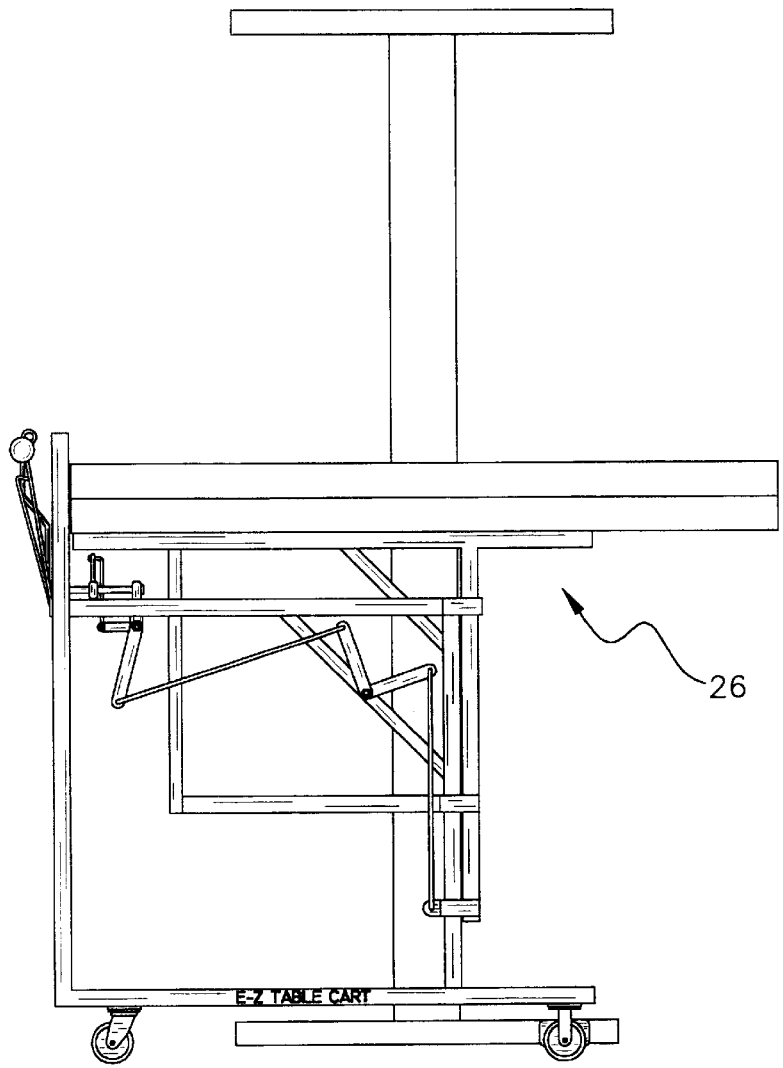
FIG. 4 is a side view of the present invention without the chair support attached thereto for supporting a pair of tables.
Figure 5:
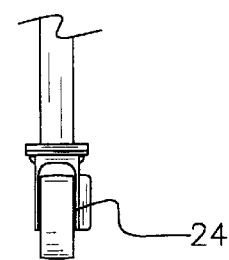
FIG. 5 is a detailed view of one of the caster wheels of the present invention.

An elevation mechanism 36 has a crank 38 mounted on the frame adjacent to the handle thereof and rotatable about a horizontal axis. As shown in FIG. 2, the crank is coupled to a cross arm 40 which is mounted between the rear bars 16 of the frame. The crank is adapted for selectively elevating the table elevation assembly with at least one table being supported on the support side bars thereof.

To accomplish this, the crank is adapted to rotate a post which has a radially extending arm 42 coupled thereto. As such, the radially extending arm 42 is adapted to rotate coincidentally with the crank about a common axis. The radially extending arm 42 is pivotally coupled to a connector 44 which is in turn connected to a central short arm 46 which is integrally coupled a rod 48 that is rotatable about an axis which resides in perpendicular relationship with an axis about which the crank rotates. Coupled to ends of the rod 48 is a pair of long arms 50. These long arms 50 reside on sides of the frame and are each connected to a V-shaped pivot arm 54 via an elongated connector 52. The V-shaped pivot arm 54 is thereafter connected to the front bars 28 of the table elevation assembly for elevating the same. It should be noted that the table(s) are elevated a height less than that of the wheels or approximately 1 inch for transportation purposes. Associated with the crank is a holder 56 which maintains the crank in an elevated orientation thereby keeping the table elevated.

Finally, a chair support 58 includes a pair of L-shaped side bars each having a horizontal extent with an unillustrated upwardly extending tab mounted to a front end thereof. Each L-shaped side bar includes a vertical extent with a top end having a tab mounted thereon and a bottom end with a groove formed thereon. Note FIG. 1. The L-shaped side bars of the chair support are coupled in parallel relationship via a cross bar mounted between bottom ends of the vertical extents of the L-shaped side bars. It should be noted that the cross bar of the chair support has a length which is half that of the L-shaped side bars of the table elevation assembly.

In use, the chair support is removably mounted between the cross bars of the table elevation assembly for supporting at least one chair on the horizontal extents thereof. To removably mount the chair support on the frame, the groove is situated on a lower one of the cross bars of the table elevation assembly and the tab is adapted to engage a rear surface of an upper one of the cross bars. It should be noted that the tables may be transported with the chair support in place.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A table and chair transport cart comprising, in combination:
    a frame including a pair of horizontally oriented lower side bars, a pair of vertically oriented rear bars mounted to rear ends of the lower side bars and extending upwardly therefrom, a horizontally oriented handle bar fixedly coupled between top ends of the rear bars, a pair of vertically oriented front bars coupled to the lower side bars adjacent to and spaced from front ends of the lower side bars and extending upwardly therefrom with sleeves mounted thereon, and a pair of horizontally oriented upper side bars mounted between top ends of the front bars and the rear bars at a location spaced from and adjacent to the top ends thereof;
    a wheel assembly including wheels mounted to the front ends of the lower side bars of the frame and adapted to pivot about a fixed horizontal axis and a pair of caster wheels mounted to rear ends of the lower side bars of the frame and adapted to pivot about a horizontal axis which is pivotable about a vertical axis;
    a table elevation assembly including a pair of vertically oriented front bars slidably situated within the sleeves of the frame, a pair of horizontally oriented support side bars coupled to top ends of the front bars of the table elevation assembly and having a length equal to the lower side bars of the frame, and a pair of L-shaped side bars each having a horizontal extent coupled to the corresponding front bar of the table elevation assembly and a vertical extent coupled to the corresponding support side bar, wherein the L-shaped side bars are coupled in parallel relationship via a pair of cross bars mounted between top and bottom ends of the vertical extents of the L-shaped side bars;
    an elevation mechanism having a crank mounted on the frame adjacent to the handle thereof and rotatable about a horizontal axis for selectively elevating the table elevation assembly with at least one table being supported on the support side bars thereof; and
    a chair support including a pair of L-shaped side bars each having a horizontal extent with an upwardly extending tab mounted to a front end thereof and a vertical extent with a top end having a tab mounted thereon and a bottom end with a groove formed thereon, wherein the L-shaped side bars are coupled in parallel relationship via a cross bar mounted between bottom ends of the vertical extents of the L-shaped side bars of the chair support, wherein the cross bar of the chair support has a length which is half that of the L-shaped side bars of the table elevation assembly, wherein the chair support is removably mounted between the cross bars of the table elevation assembly for supporting at least one chair thereon.

2. A transport cart comprising:
    a frame including a pair of spaced lower side bars, a pair of front bars, a pair of rear bars, and a pair of upper side bars, each of the front bars extending upwardly from an associated one of the lower side bars, each of the rear bars extending upwardly from an associated one of the lower side bars and in spaced relationship to an associated one of the front bars, and each of the upper side bars being coupled to a respective front and rear bar such that each upper side bar is positioned above a respective one of the lower side bars;
    wheels mounted on the lower side bars of the frame;
    an elevation assembly slidably mounted to the front bars of the frame about a vertical axis, the elevation assembly including a pair of spaced support side bars; and
    means for selectively raising the elevation assembly.

3. The transport cart as set forth in claim 2 wherein support side bars are of a length approximately equal to that of the lower side bars.

4. The transport cart as set forth in claim 2 wherein the support side bars have vertically oriented front bars coupled thereto, the front bars being slidably mounted to the frame.

5. The transport cart as set forth in claim 2 wherein the frame includes a horizontally oriented handle bar.

6. The transport cart as set forth in claim 5 wherein the means includes a crank mounted to the frame adjacent to the handle bar.

7. The transport cart as set forth in claim 2 and further including a chair support for extending below at least one chair for elevating the same via the means.

8. The transport cart as set forth in claim 7 wherein the chair support includes a pair of spaced bars.

9. The transport cart as set forth in claim 8 wherein the chair support is removably mounted to the frame.

10. A table and chair transport cart comprising:
    a frame having a pair of lower side bars and a pair of rear bars mounted to rear ends of the lower side bars, the rear bars extending upwardly from the lower side bars, the frame further having a handle bar coupled between top ends of the rear bars and a pair of front bars coupled to the lower side bars, the front bars being positioned adjacent to and spaced from front ends of the lower side bars, the front bars extending upwardly from the lower side bars, the frame further having sleeves mounted on the front bars, the frame further having a pair of upper side bars mounted between top ends of the front bars and the rear bars at a location spaced from and adjacent to the top ends of the rear bars;

a wheel assembly having wheels pivotally mounted to the front ends of the lower side bars of the frame, the wheel assembly having a pair of caster wheels pivotally mounted to rear ends of the lower side bars of the frame;

a table elevation assembly having a pair of front bars slidably situated within the sleeves of the frame, the table elevation assembly having a pair of support side bars coupled to top ends of the front bars of the table elevation assembly, the table elevation assembly having a pair of L-shaped side bars each having a first extent coupled to the corresponding front bar of the table elevation assembly and a second extent coupled to the corresponding support side bar;

an elevation mechanism having a crank mounted on the frame adjacent to the handle bar of the frame, the crank being rotatable for selectively elevating the table elevation assembly; and a chair support including a pair of L-shaped side bars each having a first extent having an upwardly extending tab mounted to a front end of the first extent, the L-shaped side bars of the chair support having a second extent having a top end having a tab mounted the top end and a bottom end with a groove formed on the bottom end, wherein the L-shaped side bars are coupled in parallel relationship via a cross bar mounted between bottom ends of the second extents of the L-shaped side bars of the chair support, wherein the chair support is removably mounted between the cross bars of the table elevation assembly for supporting at least one chair thereon.

\* \* \* \* \*